March 18, 1947.  A. E. YOUNG  2,417,580
POTATO DIGGER WITH POWER LIFT
Original Filed Feb. 10, 1941  3 Sheets-Sheet 3

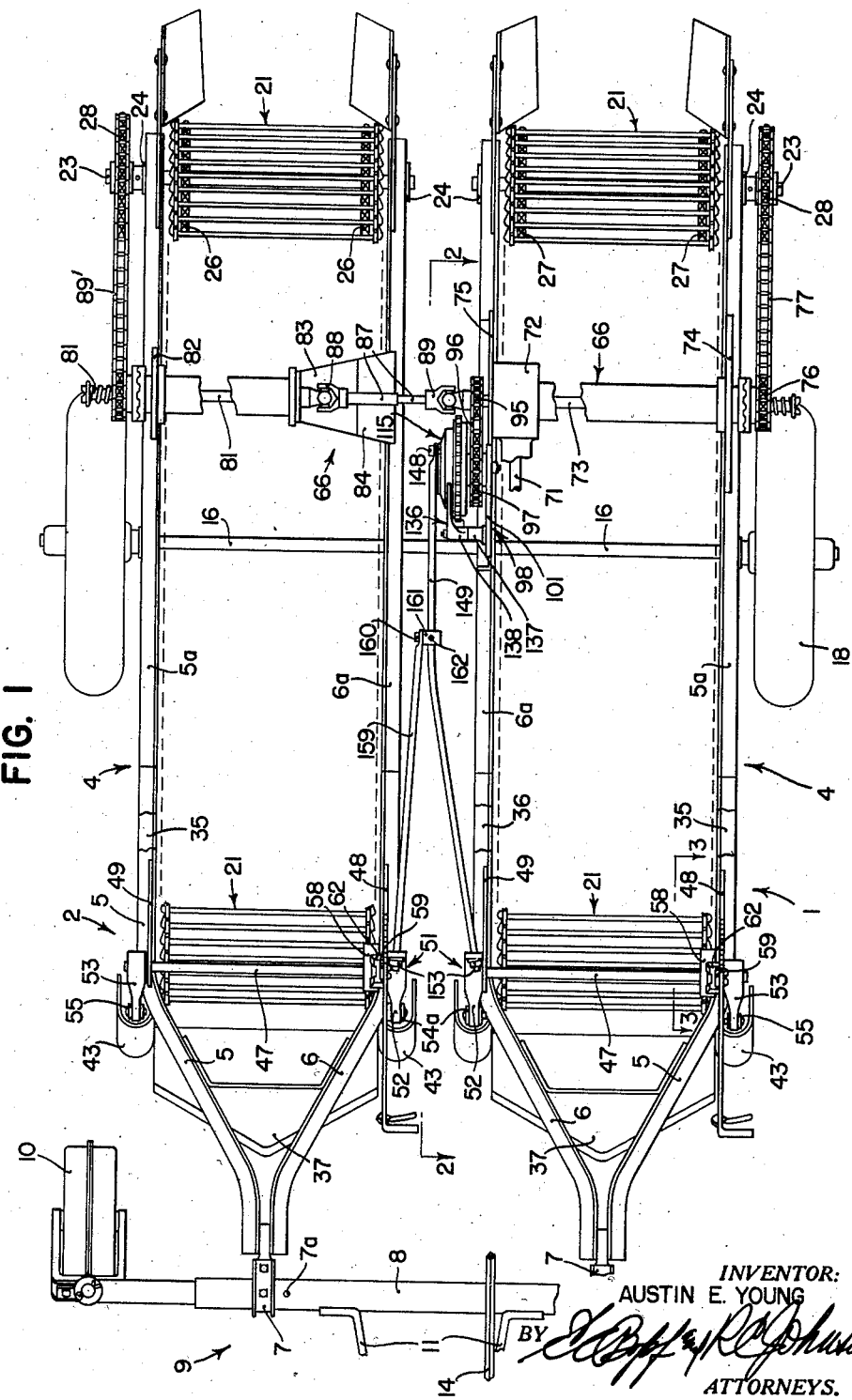

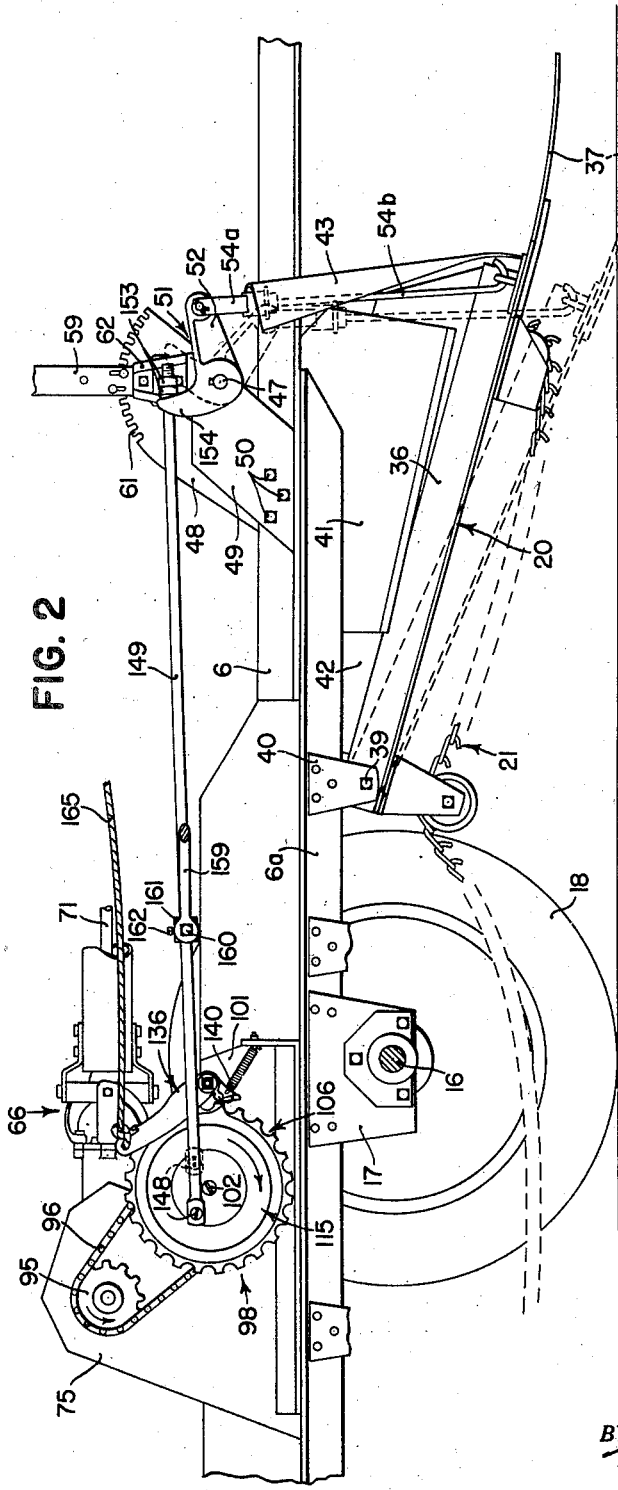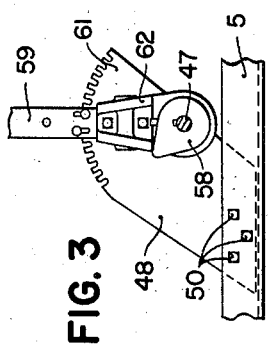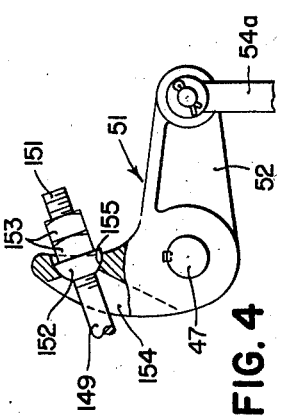

INVENTOR:
AUSTIN E. YOUNG
BY
ATTORNEYS.

Patented Mar. 18, 1947

2,417,580

UNITED STATES PATENT OFFICE 2,417,580

POTATO DIGGER WITH POWER LIFT

Austin E. Young, Syracuse, N. Y., assignor to Syracuse Chilled Plow Co., Inc., Syracuse, N. Y., a corporation of New York Continuation of application Serial No. 378,122, February 10, 1941. This application filed March 15, 1944, Serial No. 526,828

27 Claims. (Cl. 55—51)

1

This application is a continuation of my copending application, Serial No. 378,122, filed February 10, 1941, for Potato diggers, and contains subject matter similar to that disclosed in my copending application Serial No. 524,940, filed March 3, 1944.

The present invention relates generally to agricultural implements, such as potato diggers and the like, and is more particularly concerned with lifting clutch mechanism for raising and lowering the operating means between ground engaging and transport positions.

The object and general nature of the present invention is the provision of power lift clutch mechanism for a potato digger or the like, which mechanism is driven from the power means for driving the elevator chain or chains of the implement. Another important feature of the present invention resides in the provision of a two-row potato digger, each having a movable shovel unit, both of which are raised and lowered by a power lift clutch mechanism on one of the implements. Further, it is a feature of this invention to provide lifting connections with the shovel units whereby either may be adjusted in operating position independently of the other, yet both raised to transport position whenever the power lift clutch is actuated.

An additional feature of the present invention is the provision of improved self-interrupting clutch mechanism in which two driven parts are connected through planetary gear units with a continuously rotatable driving part, and in which a suitable control is arranged normally to hold one of the driven parts against rotation but movable into a position to lock the other against rotation to drive the first mentioned driven part. In this connection, it is another feature of this invention to provide means for automatically restoring the control means to a position in which the operative driven part is locked in non-rotating position.

These and other objects and advantages of the present invention will be apparent to those skilled in the art after a consideration of the following detailed description, taken in conjunction with the accompanying drawings.

In the drawings:

Figure 1 is a plan view of a two-row digger in which the principles of the present invention have been incorporated;

Figure 2 is an inner side view taken along the line 2—2 of Figure 1, showing the left-hand implement, with the shovel unit shown in lowered position in dotted lines;

2

Figure 5:
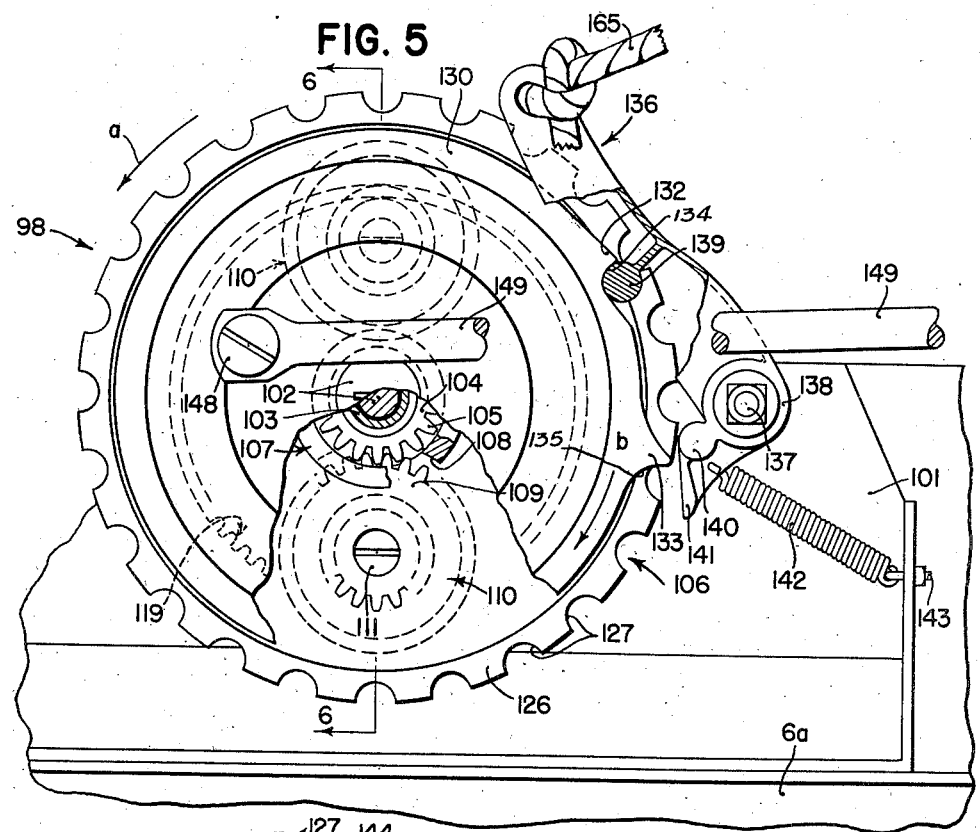
Figures 6, 7, 8:
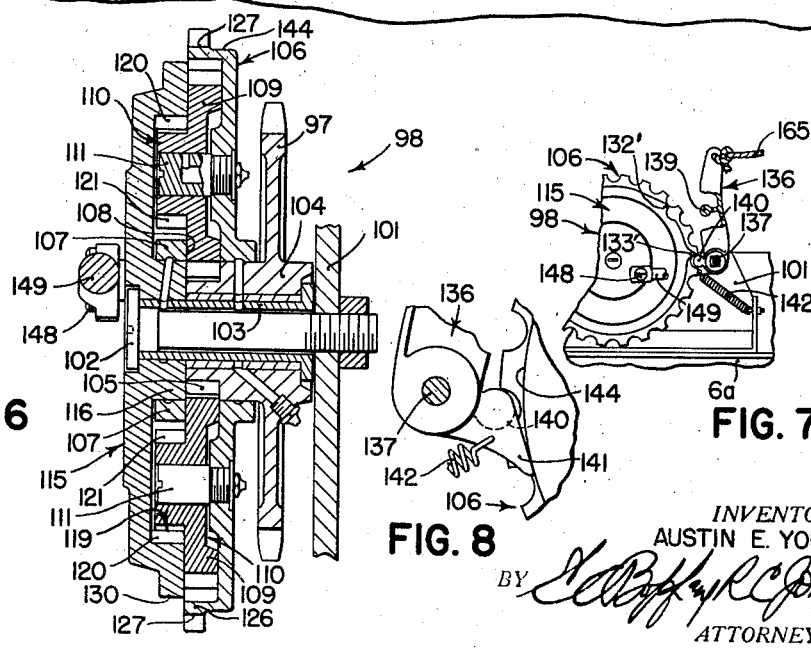

Figure 3 is a sectional view, taken generally along the line 3—3 of Figure 1, showing the manually controlled depth adjusting means;

Figure 4 is a detail view of the connection between the raising link and the rock shaft which is connected with the shovel unit;

Figure 5 is a side view of the power actuated self-interrupting clutch mechanism shown in Figure 1 as connected to raise and lower the shovel units of both implements, parts being broken away to show the interior construction;

Figure 6 is a sectional view taken along the line 6—6 of Figure 5;

Figure 7 is a fragmentary side view, showing the trip lever in its operating position for raising or lowering the shovels; and Figure 8 is a fragmentary view showing the means for limiting the outward movement of the clutch control trip lever.

Referring now more particularly to Figure 1, it will be noted that the two-row potato digger shown in this figure comprises two substantially complete implements, the left-hand implement being indicated by the reference numeral 1 and the right-hand implement by the reference numeral 2. Each implement includes a frame 4, the frame bars 5 and 6 of which converge forwardly and are connected by a bracket 7 to the transverse axle 8 of a front truck 9, and may be adjusted laterally, as by bolting the brackets 7 in different holes 7a in the axle 8. The front truck includes a pair of caster wheels 10 and a draft frame 11. The latter has a vertical hitch plate adapted to be connected to the drawbar of any suitable propelling means, preferably a tractor (not shown). The tractor is provided with a conventional power take-off shaft, an implement driving extension of which is shown at 14. The rear end of each of the implement frames 4 is supported on a transverse axle 16, as by suitable brackets 17 (Figure 2), the axle 16 extending from one side to the other of the two interconnected implements. A ground wheel 18 is carried at each end of the axle 16, and the ground wheels 18, together with the front caster wheels 10, support the machine during transport and in operation. Preferably, the brackets 17 may be connected to the axle 16 at laterally adjusted points, so that, with the above mentioned lateral adjustment of the brackets 7, the two digger units may be adjusted for different row spacings, if desired.

Each of the implements 1 and 2 is, in general, constructed similar to the potato digger shown in the patent to Curtiss L. Cook, 2,172,435, issued September 12, 1939, to which reference may be made if necessary. Briefly, each of the implements 1 and 2 comprises, in addition to the parts mentioned above, a tool or shovel unit 20 connected to the forward end of the frame 4, an elevator chain 21 of the usual rod construction, and driving mechanism for the chain, preferably in the form of a transverse shaft 23 supported in bearings 24 on the frame bars 5 and 6, a pair of sprocket members 26 and 27 about which the elevator chain 21 is trained, and a driving sprocket 28 fixed to one end of the shaft 23. Each of the implements 1 and 2 also includes other features, such as supporting and agitating sprockets and rear deflectors.

Each shovel unit comprises a frame made up of a pair of angle members 35 and 36 to the lower ends of which a pointed shovel 37 is connected in any suitable manner. The rear ends of the two angle members 35 and 36, which serve as arms supporting the associated shovel 37, are pivotally connected, as at 39, to brackets 40 fixed to the generally central portions of the two frame members 5a and 6a. Each shovel 37 is capable of vertical swinging movement about the axis defined by the pivots 39. Overlapping plates 41 and 42 are fixed, respectively, to the frame and shovel bars, which with a pair of curved plates or guard members 43 define the throat of the implement. Preferably, the curved guards 43 are connected to the forward end of the lower plates 42.

Each shovel unit is raised and lowered by means mounted on the forward end of the associated implement frame. Preferably, such means includes a transverse rock shaft 47 journaled in a pair of brackets 48 and 49 fixed, as by bolts 50, to the associated frame angles 5 and 6. Secured to the inner end of each of the rock shafts 47 is a lifting arm or bell crank 51, the forwardly extending arm section 52 of which is connected by means of link sections 54a and 54b with the forward end of the shovel arm or angle 36. An arm 53 is fixed to the outer end of the rock shaft 47 and is connected by means of similar link means 55 to the forward end of the other shovel arm or angle 35. Thus, each shovel unit may be raised and lowered by rocking and associated transverse rock shaft 47. Both of the arms 51 and 53 are fixed in any suitable way rigidly to the rock shaft 47 associated therewith.

As best shown in Figure 3, suitable hand-controlled means is provided for limiting the downward movement of the shovel unit of each implement. To this end, a cam-like arm 58 is fixed to each lifting rock shaft 47 adjacent the bracket 48, and pivotally mounted on the shaft 47 is a hand lever 59 having the usual detent mechanism adapted to latch the hand lever 59 to a sector 61 formed on or carried by the bracket 48. The hand lever 59 includes an abutment or stop member 62 with which the outer end of the stop arm 58 is adapted to engage. As will be seen from Figure 3, moving the hand lever 59 to various positions permits the associated shovel unit 37 to move to various lowered or operating positions. If desired, the hand lever 59 may be used to raise the associated shovel unit into a raised or transport position, but preferably suitable mechanism deriving power from the driving means for the elevator chains is employed for raising both shovel units at the same time, as will be described below.

As mentioned above, power for driving the two elevator chains 21 is derived from the tractor power take-off shaft 14, and as best shown in Figures 1 and 2, the power drive means is substantially the same as the power drive shown in the co-pending application of Curtiss L. Cook, filed July 18, 1940, Serial No. 346,073. Briefly, the power drive mechanism, indicated in its entirety by the reference numeral 66, comprising power shaft means extending from the shaft 14 rearwardly to a rear power shaft section 71 is connected by suitable gearing, indicated at 72, to a transverse drive shaft 73 supported in bearings carried by a pair of vertically extending brackets 74 and 75. The left or outer end of the jackshaft 73 carries a sprocket 76 around which a driving chain 77 is trained, the chain passing around the driving sprocket 28 on the drive shaft 23 of the left-hand digger unit, whereby power is delivered from the tractor motor through the power shaft sections and the transverse power shaft or jackshaft 73 to the elevator chain 21 of the left-hand unit. The right-hand potato digger unit 2 is provided with a power shaft or jackshaft 81 similar to the shaft 73. The jackshaft 81 is supported in a bracket 82 fixed to the laterally outer side of the potato digger unit 2 and supported at its laterally inner end in a laterally extending plate 83 fixed to a bracket 84 carried at the laterally inner side of the implement 2. The shaft 81 is connected by telescopic cross shaft sections 87 and a pair of universals 88 and 89 to the power shaft or jackshaft 73 of the left-hand implement 1. The telescopic cross shaft sections 87 accommodate any lateral adjustment of one implement relative to the other, and they also accommodate relative movement of one digger with respect to the other if the front ends are not supported at the same height, as might occur when the front truck passes over uneven ground. The outer end of the shaft 81 carries a sprocket around which a chain 89' is trained, the chain 89' extending around the driving sprocket 28 of the implement 2. Thus, power from the tractor power take-off shaft 14 is delivered to both of the elevator chains 21 of the two interconnected implements.

According to the principles of the present invention, power is taken from the jackshaft 73 of the left-hand implement 1 to drive a self-interrupting clutch mechanism which is connected to raise both of the shovel units 73 of the two units at the same time. This power lift clutch mechanism and associated parts will now be described.

A sprocket 95 is fixed to the jackshaft 73 just inside the universal joint 89 and receives a drive chain 96 which at its lower end is trained around the driving sprocket 97, which forms a part of the self-interrupting clutch mechanism, indicated in its entirety by the reference numeral 98. Thus, the sprocket 97 is continuously driven from the jackshaft 73 during all times that the outfit is in operation. Referring now more particularly to Figures 5 and 6, a lift support plate 101 is mounted in any suitable manner on the inside frame bar 6a of the left-hand implement and receives a bolt 102 by which a stationary bushing 103 is firmly secured in place. The drive sprocket 97 is journaled for rotation on the bushing 103 and is provided with a hub 104 in one end of which gear teeth 105 are formed. The hub 104 thus forms the driving gear of the clutch unit 98. A rotatable housing 106 is mounted on the hub 104 and is provided with a central hub section 107 which at two diametrically opposite points is slotted out, as at 108, to receive the larger gear section 109 of a compound planet gear, indicated in its entirety by the reference numeral 110. If desired, I may employ only one gear member 110, but two may be used, as shown in Figure 6. Each gear member 110 is mounted for rotation on a stud 111 fixed to the rotatable housing 106 in any suitable manner, as by being threaded into the radial web portion thereof. A second rotatable housing 115 is provided with a hub 116 and is rotatably journaled on the stationary bushing 103. The hub 116 is received within the laterally outer end of the hub 107, whereby all of these parts are maintained in accurate concentric relation. The rotatable housing 115 is formed peripherally as an internal ring gear, indicated at 119, and is provided with teeth 120 which mesh with the other gear section 121 of each of the compound planet gears 110. Thus, as best shown in Figure 6, the clutch mechanism 98 includes planetary gearing, of which the hub 104 is the driving member and the two rotatable housings 106 and 115 the driven members, the latter being driven by means of the planetary gears 110. As will be readily understood, either of the members 106 and 115, if held against rotation, may serve as the reaction member by which the gears 110 will drive the other member. As described above, the hub 104 with the teeth 105 serves as the sun gear, the gears 10 serve as the planet gears of which the member 106 is the planet gear carrier, and the other rotatable housing 115 serves as the ring gear.

According to the principles of the present invention, the rotatable housing 115 is link-connected with the two shovel units for the purpose of raising and lowering them, and suitable control means is provided for locking one or the other of the members 106 and 115 against rotation and releasing the other member to permit it to rotate, whereby a positive driving connection is established through the clutch mechanism, both during the raising and lowering movements of the two interconnected shovel units.

As will be seen from Figures 1, 2 and 5, the rotatable housing member 106 is provided with a radial flange 126 which is formed with a plurality of peripheral notches or scallops 127. As will also be seen from Figure 6, the radial flange 126 is offset axially so as to lie in a plane closely adjacent a flange 130 that is formed on the other rotatable housing member 115. The member 115 is provided on the flange 130 with a stop lug or cam 132 and an adjacent trip lug or cam 133. The lugs 132 and 133, and the adjacent portions form notches 134 and 135 in the periphery of the member 115. Cooperating with the notches 127 and the lugs 132 and 133 is a trip or control lever 136. The lever 136 is mounted for rocking movement on a stud 137 fixed in any suitable manner to the supporting plate 101. It will be noted, particularly from Figure 5, that the lug or lugs 132 do not extend radially outwardly beyond the bottom of the notches 127.

The trip lever 136 is of particular construction. At one side of the axis defined by the journal portion 138 receiving the lug 137 the lever 136 carries a lug 139 which lies in the plane of the flange 130 on the rotatable housing member 115, and at the other side of the axis of the lever 136 is a lug 140 that extends substantially the axial length of the journal section 138 and is in a position to engage any one of the notches 127 formed in the flange 126 of the rotatable housing member 106. A lug 141 is carried by the trip lever 136 and serves as a stop limiting the outward movement of the lever (Figures 7 and 8), as will be explained below. The relation between the lugs 139 and 140 is such that only one may be engaged with the associated lugs 132 and notches 127 at any one time for after the lug 139 has been moved out of the notch 134 and clears the lug 132, it then rides along the flange 130, and in this position of the lever 136 the lug 140 thereon clears the notches 127 on the member 106. In effect, therefore, in this position of the lever 136 it is out of operative engagement with both members 106 and 115. Ordinarily, however, either one or the other is driven; and in that respect each may be said to be intermittently operated. A suitable spring 142 is anchored at one end, as at 143, to the supporting plate 101 and at the other end is connected with the lever 136, biasing the same for movement into the position shown in Figure 5, in which the lug 139 engages the lug 132 on the member 115, thereby holding the latter against rotation while the other lug 140 on the lever 136 clears the notches 127, thereby permitting the member 106 to rotate, it being remembered that the part 106 serves as the planet gear carrier for the planetary gearing of which the members 106 and 115 are parts.

Referring now more particularly to Figure 1, it will be noted that the member 115 carries a crank pin 148 which receives the rear end of a lifting link 149. The latter extends forwardly and is threaded at its forward end, as at 151, to receive a socket washer 152 and an adjusting nut 153. The socket washer 152, as best shown in Figure 4, seats in a socket 155 formed in the arm 154, which forms a part of the bell crank or arm member 51 that is fixed to the laterally inner end of the lifting rock shaft 47 of the left implement 1. From Figure 2 it will be noted that the link 149 is thus connected with the lifting means for the left-hand shovel 37 by a one-way connection; that is, rearward movement of the link 149 will rock the member 51 and raise the tools, but forward movement of the link 149 will not lower the shovel, unless permitted to do so by the depth adjusting lever 59. In other words, the latter determines the operating position of the shovel while the power lift mechanism, just described, controls the raising of the shovel, either operating in one or the other direction independently of the other. The shovel of the right-hand unit is connected so as to be raised at the same time that the left-hand shovel is raised, and to this end, as best shown in Figure 1, the left or laterally inner end of the lifting shaft 47 of the right-hand unit is provided with a lifting bell crank 51, like that described above, and a lifting link 159 is pivoted at its rear end on a stud 160 carried by a block 161 which is adjustably secured to the lifting link 149 by a set screw 162 or the equivalent. The pivot block 161 is secured to the lifting link 149 well toward the rear so that the link 159 is of the requisite length so that any variation in the position of one digger relative to the other, as by the aforesaid lateral adjustment, or otherwise, will have no appreciable effect upon the action of the power lift mechanism on one digger controlling the shovels of both diggers. The forward end of the right-hand lifting link 159 is formed substantially the same as the forward end of the lifting link 149 and is provided with the same kind of socket washer 152 and adjusting nut 153. By virtue of the construction and connection of the lifting links 149 and 159 and associated parts, whenever the member 115 is rotated into the position shown in Figure 1, a rearward pull is exerted through the links 149 and 159 to raise both shovels of the left and right-hand implements.

The operation of the control of the power lift clutch mechanism 98 is substantially as follows:

The normal transport or raised position of the parts is shown in Figures 1 and 5. In this position, the weight of the two shovel units is transmitted by the arms 52 and 53 to the lifting shafts 47, and from the latter through the two lifting links 149 and 159 to the rotatable member 115. The arrangement of the parts is such that the pivot stud 148 is slightly above the axis of rotation of the member 115, whereby the weight of the shovels tends to rotate the member 115 in a clockwise direction, as viewed in Figure 5. However, the spring 142 holds the control lever 136 in a position in which the lug 139 engages the lug 132 on the rotatable member 115, thereby locking the latter against rotation. When the lug 139 on the control lever 136 engages the lug 132 on the member 115, the other lug 140 on the control lever 136 is in a position clearing the notches 127. Therefore, since the driving sprocket 97 and associated sun gear 105 are rotated continuously, this rotation is transmitted by the planet gears 110 to the planet gear carrier member 106, acting against the locked member 115 which is stationary. The sprocket gear 97 is normally driven in the direction of the arrow a shown in Figure 5, and when the member 115 is locked against rotation, the notched member 106 is driven idly in the same direction.

When it is desired to lower the shovels into their operating position, which is determined by the hand levers 59 and associated abutment or stop members 62, the operator pulls on the cable 165, thereby swinging the control lever 136 to the position shown in Figure 7, in which the lug 139 is moved away from the lug 132 on the member 115 to which the lifting link 149 is connected, at the same time moving the lug 140 into engagement with one of the notches 127 and thereby locking the latter against rotation in either direction. It will be noted that both of the lugs 139 and 140 are rounded, and the relation of the parts is such that by the time the lug 140 engages in one of the notches 127 far enough to prevent the member 106 from rotating, the other lug 139 is in a position permitting the lug 132 to pass the lug 139. Thus, as soon as the lug 140 locks the member 106 against rotation, the drive is then transmitted through the planetary gearing to the member 115, this member rotating in a clockwise direction, as indicated by the arrow b in the lower portion of Figure 5. The weight of the digger shovels and associated parts also tend to turn the member 115 in the direction of arrow b. If the operator retains his hold on the rope 165, holding the lug 140 in engagement with the member 106, the shovels will be lowered no faster than the member 115 is driven. However, if desired, the operator may release the cable 165 a moment after the trip lever 136 has been operated to release the lug 132. The shovels will then move downwardly under the action of gravity and the lug 139 will merely ride along the flange 130. The lowered position of the shovels 37 is determined by the hand levers 59. After the shovels reach their lowered position, the member 106 merely idles and the member 115 remains stationary. Since the weight of the shovels and other parts tends to hold the member 115 in a position with the pin 148 forward, there is no need for a second set of lugs 132, 133 in the type of clutch shown in Figure 2.

When subsequently it is desired to raise the tools, all the operator has to do is to pull the cable 165, which again moves the control lever 136 into the position shown in Figure 7 which moves the lug 140 into one of the notches 127 and locks the member 106 against rotation, whereupon the member 115 will be driven in the direction of arrow b, rotating the stud 148 in a clockwise direction (Figure 2) until it picks up the shovels and begins raising them. The reaction of raising the shovels by the rotation of the member 97 tends to cause the member 106 to rotate in a counterclockwise direction. However, this is resisted by the engagement of the lug 140 in one of the notches 127. The operator may therefore release his hold on the cable 165, the reaction exerted through the member 106 thus holding the lever 136 in the position shown in Figure 7. In this position, the lug 141 bears against the shoulder 144 (Figure 6) on the member 106, thus limiting the clockwise movement of the trip lever 136 under this reaction. The continued rotation of the sprocket 97 therefore continues the clockwise rotation (Figures 2 and 5) until the lug 133 comes into engagement with the lug 140, as shown in Figure 7. At this point the continued rotation of the member 115 therefore acts positively to swing the trip lever 136 in a counterclockwise direction, moving the lug 140 out of engagement with the member 106 and swinging the lug 139 into a position to reengage the lug 132, thus positively swinging the trip lever 136 from the position shown in Figure 7 back to the position shown in Figure 5. The parts are so arranged, that by the time this occurs the pivot 148 passes to a point above the axis of rotation of the member 115, defined by the pivot bolt 102, so that the weight of the raised shovels tends to rotate the member 115 in a clockwise direction (Figure 5), thus holding the lug 132 against the lug 139 on the trip lever 136, thereby locking the rotatable member 115 in its raised position.

Although the clutch mechanism just described finds its greatest usefulness in potato diggers and other agricultural implements, the clutch mechanism of the present invention obviously may have other uses. For example, if the load is such as to tend to rotate the driven member 115 continuously, or at least through a full revolution, rather than only through approximately a half revolution as in the instant construction, and where the driven member 115 carries only one set of lugs 132, 133, the clutch will automatically disengage after a complete revolution. If it should be desired to provide a self-interrupting clutch which positively disengages, say, every 180 degrees, then two sets of lugs 132', 133' would be provided at points diametrically opposite the lugs 132, 133 shown in Figures 2 and 5. As will be apparent, more than two sets of lugs may be employed and they may be spaced about the periphery of the driven member 115 at any desired spacing so as to secure the desired angular rotation before interruption. It is an important feature of a clutch of the type described that the reaction of the transmission of the driving force is utilized for holding the spring biased trip lever in a position engaging the member 106 until the trip lever 136 is actually forced back into a position holding the driven member against further rotation.

It will be understood that while I have shown the self-interrupting planetary clutch mechanism as incorporated in a two-row potato digger, such mechanism may be employed in other implements, especially those in which it is desired that both the raising and lowering movements be controlled by the power connections. It will also be seen that the driven member 115 may have one, two or more pairs of controlling lugs 132 and 133 depending upon the extent of revolution it is desired that the member 115 shall make before its movement is automatically interrupted. Thus, while I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A two-row potato digger comprising a pair of digging implements connected in side by side relation, each including a vertically adjustable shovel unit, elevator chain means supported on said shovel unit and the rear portion of the implement, a shaft supported on one of said implements and connected to drive the elevator chain means of both implements, power means for driving said shaft, power lift mechanism on one implement and operatively connected to be driven by said shaft, and connections between said power lift mechanism and each of said shovel units, whereby actuation of said power lift mechanism raises or lowers both shovel units.

2. A two-row potato digger comprising a pair of implements connected together in side by side relation, each including a generally vertically movable shovel unit, separate relatively movable frame means to which the shovel units are respectively connected, a lifting member movable on each frame means and interconnected with the associated shovel unit to move therewith, and a manually adjustable part on each frame means for limiting the movement of said member in one direction, thereby serving to limit the downward movement of the associated shovel unit, lifting mechanism mounted on the frame means of one of said implements and having a one-way connection with the associated lifting member of that implement, whereby operation of said lifting mechanism acts through said lifting member to raise the shovel unit associated therewith and a connection between said lifting mechanism on said one implement and the lifting member of the other implement whereby said lifting mechanism on said one implement controls the raising of both of said shovel units.

3. A two-row potato digger comprising a pair of implements connected together in side by side relation, each implement including a frame, a vertically adjustable shovel unit connected therewith, and means mounted on the frame for raising and lowering said shovel, a power lift mechanism supported on one of said implements and including a rotatable part, a link connection from said part to the raising and lowering means of said one implement, and a link connection adjustably associated with said first mentioned link connection and extending to the raising and lowering means of the other implement whereby both shovel units may be raised and lowered by said power lift mechanism.

4. In a two-row potato digger, a pair of implements connected together in side by side relation, each including a frame, a shovel unit pivotally connected with said frame, a rock shaft mounted on each of said frames and operatively connected with the associated shovel unit to raise the same, relative to the associated frame, an elevator chain means carried on each frame and the associated shovel unit, and means for driving the elevator chain means, a power lift mechanism carried on the frame of one implement, means for driving the same from the chain driving means of that implement, and an adjustable one-way connection between said power lift mechanism and each of said rock shafts, whereby the power lift mechanism on said one implement may be actuated to raise the shovel units of both implements.

5. A two-row potato digger comprising a pair of implements connected together in side by side relation, each including an elevator chain, a movable shovel unit and a rock shaft connected with the associated shovel unit for raising the same, means for driving the elevator chain of each implement including a jackshaft mounted for rotation on each implement, means for driving one of said jackshafts, a driving connection between said one jackshaft and the other jackshaft, a power lift unit carried at the inner side of the implement on which said one jackshaft is mounted, means for driving said power lift unit from said one jackshaft and a connection from said power lift mechanism to the laterally inner portion of each rock shaft.

6. A two-row potato digger comprising a pair of implements connected together in side by side relation, each including an elevator chain, a movable shovel unit and a rock shaft connected with the associated shovel unit for raising the same, means for driving the elevator chain of each implement including a jackshaft mounted for rotation on each implement, means for driving one of said jackshafts, a connection between said jackshafts, a power lift unit carried at the inner side of the implement on which said one jackshaft is mounted, and a connection including a link extending from said power lift mechanism to the rockshaft on the implement on which said power lift mechanism is mounted, and a link connection from said one link to the laterally inner end of the rock shaft mounted on the other implement, the position of one link with respect to the other being adjustable.

7. A power lift attachment for potato diggers and like implements including operating mechanism, a transverse jackshaft for driving said mechanism, tool means adapted to be raised and lowered, and a rockshaft operatively connected with said tool means for raising and lowering the same, said power lift attachment comprising self-interrupting clutch means including a driving part and a driven part, means for connecting said driving part with said jackshaft, an arm adapted to be connected to said rock shaft, connecting means between said arm and the driven part of said self-interrupting clutch mechanism, planetary gear mechanism connecting the driving and driven parts of said self-interrupting clutch, and means adapted to be mounted on a stationary part of the potato digger for controlling the application of power through said planetary gearing to the driven part of said self-interrupting clutch mechanism.

8. A power lift attachment for potato diggers and like implements including operating mechanism, a transverse jackshaft for driving said mechanism, tool means adapted to be raised and lowered, and a rock shaft operatively connected with said tool means for raising and lowering the same, said power lift attachment comprising self-interrupting clutch means including a driving part and a driven part, means for connecting said driving part with said jackshaft, an arm adapted to be connected to said rock shaft, and connecting means between said arm and the driven part of said self-interrupting clutch mechanism, said self-interrupting clutch mechanism including planetary gearing for transmitting the drive from said driving part to said driven part, a reaction member associated with said planetary gearing, and a control member movable from a position locking said driven part against rotation to a position locking said reaction member against rotation, whereby said driven part may be driven.

9. An agricultural implement comprising a part to be raised and lowered, means for raising and lowering said part comprising a planetary gear unit including a sun gear, a planet gear carrier member and a ring gear member, driving means for driving said sun gear, connections between said part to be lifted and one of said members and including a crank on one end of said one member and a link connecting said crank with said part to be lifted, said one member tending to be rotated in one direction by the weight of said part when the latter is in a raised position, a support receiving said one member, the latter extending outwardly at the end of said support receiving said crank so as to accommodate rotation of said crank through a full revolution, and a control having one portion engageable with said one member for holding the latter against movement in said one direction and another portion engageable with the other member for locking it against rotation so as to transmit the drive from said sun gear to the member to which the lifting connections are connected to rotate the latter member in said one direction so as to control the lowering of said part.

10. In a potato digger, frame means, a shovel unit movably connected therewith for generally vertical movement between a lowered working position and a raised transport position, a normally rotating driving gear journaled on the frame, a driven gear also journaled on said frame, linkage operatively connecting said driven gear with said shovel unit for raising and lowering the latter, a control lever pivoted on said frame and movable into a position engaging said driven gear for holding the latter against rotation, said lever being movable into a second position to permit said driven gear to rotate, means including planetary gearing for transmitting the drive from said driving gear to said driven gear, and a cam on said driven gear engageable with said control lever for moving the latter back into said first position after a predetermined extent of rotation of said driven gear.

11. A potato digger as defined in claim 10, further characterized by depth adjusting means reacting against said frame means for adjusting the operating position of said shovel unit independently of said driven gear when the latter is held against rotation by said lever, and said linkage including lost motion means accommodating movement of said shovel unit by said depth adjusting means.

12. An agricultural implement comprising a pair of frame units one movable relative to the other, tool means movably connected with each of said frame units, a part mounted on and reacting against each frame unit for shifting the associated tool means relative thereto, power lift mechanism carried by one of said frame units, and connections arranged to accommodate relative movement between said frame units and extending from said power lift mechanism to the tool operating part of each of said units for controlling both of them.

13. An agricultural machine comprising a pair of frame units disposed alongside one another, supporting means for said frame units and accommodating both lateral adjustment of one frame unit with respect to the other and relative vertical swinging movement of one with respect to the other about an axis, tool means movably connected with each of said frame units, power lift mechanism carried by one of said frame units, an operating connection extending between said power lift mechanism and the movable tool means of said one unit, and a second connection accommodating relative lateral and swinging movement between said units extending from said first connection at a point approximately adjacent said axis of relative movement to the tool means of the other unit, whereby said power lift mechanism controls both tool means.

14. An agricultural implement comprising a pair of frame units one movable relative to the other about a generally transverse axis, tool means movably connected with each of said frame units, a part mounted on and reacting against each frame unit for shifting the associated tool means relative thereto, power lift mechanism carried by one of said frame units adjacent said axis, and separate connections arranged to accommodate relative movement between said frame units and extending from said power lift mechanism to the tool operating parts, respectively, on said frame units, the disposition of said power lift mechanism adjacent said axis accommodating relative movement between said frame units without materially changing the relation between either tool means and the associated frame unit.

15. An agricultural implement comprising a pair of implement units connected together in side by side relation, each implement unit including a frame, adjustable tool means connected therewith, and means mounted on the frame for adjusting the associated tool means, a power lift mechanism supported on one of said implement units and including a rotatable part, a link connection from said part to the raising and lowering means of said one implement unit, and a link connection associated with said first mentioned link connection and extending to the raising and lowering means of the other implement unit whereby both of said tool means may be raised and lowered by said power lift mechanism.

16. An agricultural implement comprising a pair of implement units connected together in side by side relation for relative movement about a generally transverse axis, each implement unit including a frame, adjustable tool means connected therewith, and means mounted on the frame for adjusting the associated tool means, a power lift mechanism supported on one of said implement units and including a rotatable part, a link connection from said part to the raising and lowering means of said one implement unit, and a link connection pivotally connected with said first mentioned link connection adjacent said axis and extending to the raising and lowering means of the other implement unit whereby both of said tool means may be raised and lowered by said power lift mechanism in substantially any position of one implement unit relative to the other.

17. A pair of movably interconnected agricultural implements, each having tool means adapted to be raised and lowered relative thereto, a power lift mechanism on one implement, a first connection extending therefrom to the tool means of that implement, and a second connection extending from said first connection to the tool means of the other implement, whereby both tool means may be raised and lowered by the power lift mechanism on said one implement.

18. A pair of movably interconnected agricultural implements, each having tool means adapted to be raised and lowered relative thereto, a power lift mechanism on one implement, a first connection extending therefrom to the tool means of that implement, a second connection extending from said first connection to the tool means of the other implement, whereby both tool means may be raised and lowered by the power lift mechanism on said one implement, and means for adjusting the connection between said first and second connections.

19. An agricultural implement comprising frame means, a tool unit movably connected therewith for generally vertical movement between a lowered working position and a raised transport position, a normally rotating driving gear journaled on the frame, a driven gear also journaled on said frame, linkage operatively connecting said driven gear with said tool unit for raising and lowering the latter, a control lever pivoted on said frame and movable into a position engaging said driven gear for holding the latter against rotation, said lever being movable into a second position to permit said driven gear to rotate, means including planetary gearing for transmitting the drive from said driving gear to said driven gear, and a cam on said driven gear engageable with said control lever for moving the latter back into said first position after a predetermined extent of rotation of said driven gear.

20. An agricultural implement comprising frame means, a tool unit movably connected therewith for movement between two positions, a normally rotating driving gear journaled on the frame, a driven gear also journaled on said frame, linkage operatively connecting said driven gear with said tool unit, a control lever pivoted on said frame and movable into a position engaging said driven gear for holding the latter against rotation, said lever being movable into a second position to permit said driven gear to rotate, means including planetary gearing and said planetary gearing including a rotatable part which, when held against rotation, serves to transmit the drive from said driving gear to said driven gear, and means actuated by said control lever for holding said rotatable part against rotation when said control lever is moved into said second position.

21. An agricultural implement as defined in claim 20, further characterized by means actuated by the driven gear for moving the control lever back into its first position after a predetermined extent of rotation of the driven gear.

22. The combination of an agricultural implement having a part adapted to be raised into a lifted position and to return to a lowered position by gravity, power driven means operatively connectible with said part for moving it and including members movable into an approximately dead center relationship for holding said part in its lifted position, and means for optionally lowering said part through said power driven means or by gravity independently of said power driven means.

23. The combination of an agricultural implement having a part adapted to be raised into a lifted position and to return to a lowered position by gravity, power driven means connected with said part to move it into a raised position and including members movable into an approximately dead center relationship for holding said part in its lifted position, said power driven means also being releasably engageable with said part for lowering the latter at a speed determined by the rate of operation of the power driven means, said part returning to lowered position by gravity when said power driven means is in released position, and means cooperating with said power driven means and said part for optionally returning the latter to lowered position by said power means or by gravity.

24. A two-row potato digger comprising a pair of implements connected together in side by side relation, each including a generally vertically movable shovel unit, separate relatively movable frame means to which the shovel units are respectively connected, a lifting member movable on each frame means and interconnected with the associated shovel unit to move therewith, lifting mechanism mounted on the frame means of one of said implements and connected with the associated lifting member of that implement, whereby operation of said lifting mechanism acts through said lifting member to raise the shovel unit associated therewith, and a connection between said lifting mechanism on said one implement and the lifting member of the other implement whereby said lifting mechanism on said one implement controls the raising of both of said shovel units.

25. An agricultural implement comprising a ground supported part, ground engaging tool means movable relative thereto, a support on said part, a constantly rotatable driving element mounted for rotation on said support, a driven element having a crank thereon, a link connected to said crank at the outer side thereof and with said tool means whereby rotation of said crank raises and lowers said tool means, means mounting said driven element on said support coaxial of said driving element and in a position on said support so that the latter does not extend beyond the driven part whereby said link will clear the end of the support and said crank may turn through a full revolution, and controllable planetary gearing connecting said driving and driven elements.

26. An agricultural implement comprising a ground supported part, ground engaging tool means movable relative thereto, a support on said part, a constantly rotatable driving element mounted for rotation on said support, a driven element having a crank thereon, a link connected to said crank at the outer side thereof and with said tool means whereby rotation of said crank raises and lowers said tool means, means mounting said driven element on said support coaxial of said driving element and in a position on said support so that the latter does not extend beyond the driven part whereby said link will clear the end of the support and said crank may turn through a full revolution, and controllable planetary gearing connecting said driving and driven elements and including a sun gear on said driving element, a ring gear member and a carrier member having planet gear means meshing with said sun gear and said ring gear member, control means shiftable between two positions and carrying two sections adapted in one position to engage said driven element and in the other position to engage one of said members for driving said crank or holding said crank against rotation, optionally, and means for shifting said control means from one position to another.

27. The invention set forth in claim 26, further characterized by both of said control sections being out of engagement with said one member and said driven element in an intermediate position of said control means.

AUSTIN E. YOUNG.

REFERENCES CITED

The following references are of record in the file of this patent:

UNITED STATES PATENTS

| Number | Name | Date |
|---|---|---|
| 2,172,435 | Cook | Sept. 21, 1939 |
| 2,215,516 | Schooler | Sept. 24, 1940 |
| 2,059,676 | Altgelt | Nov. 3, 1936 |
| 2,109,667 | Johnston | Mar. 1, 1938 |
| 2,199,668 | Lawler | May 7, 1940 |

FOREIGN PATENTS

| Number | Country | Date |
|---|---|---|
| 316,640 | British | Aug. 1, 1929 |